Figure 1:
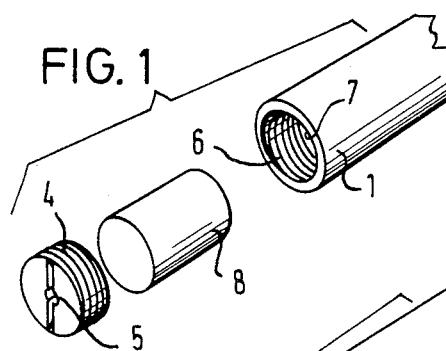

United States Patent [19]

Föhl

[11] Patent Number: 4,573,322

[45] Date of Patent: Mar. 4, 1986

[54] DRIVING DEVICE ESPECIALLY FOR RETURN STIFFENING OF A SAFETY BELT IN AN AUTOMATIC SAFETY BELT WIND-UP DEVICE

[75] Inventor: Artur Föhl, Schorndorf, Fed. Rep. of Germany

[73] Assignee: Repa Feinstanswerk GmbH, Aldorf, Fed. Rep. of Germany

[21] Appl. No.: 750,237

[22] Filed: Jun. 28, 1985

Related U.S. Application Data

[63] Continuation of Ser. No. 543,086, Oct. 18, 1983, abandoned.

[30] Foreign Application Priority Data

Oct. 19, 1982 [DE] Fed. Rep. of Germany ....... 3238710

[51] Int. Cl.[4] ...................... F02N 13/00; B60R 22/28
[52] U.S. Cl. .................................. 60/638; 92/85 R; 92/137; 280/805; 280/806
[58] Field of Search ............. 92/85 R, 85 A, 23, 143, 92/137; 60/638, 632; 91/396, 399, 23, 400; 280/805, 806

[56] References Cited

U.S. PATENT DOCUMENTS

| 579,204 | 3/1897 | Wilson | 92/85 A |
|---|---|---|---|
| 3,146,459 | 9/1964 | Bade | 92/85 R |
| 3,496,840 | 2/1970 | Wandel et al. | 92/85 R |
| 3,583,530 | 6/1971 | De Venne | 280/805 |
| 3,703,125 | 11/1972 | Pauliukonis | 92/85 R |
| 3,888,085 | 6/1975 | Larsonneur | 60/638 |
| 4,008,909 | 2/1977 | Otari et al. | 280/805 |
| 4,423,846 | 1/1984 | Fohl | 280/806 |
| 4,442,674 | 4/1984 | Fohl | 60/632 |
| 4,458,921 | 7/1984 | Chiba et al. | 60/638 |

Primary Examiner—Robert E. Garrett
Assistant Examiner—Richard S. Meyer
Attorney, Agent, or Firm—Yount & Tarolli

[57] ABSTRACT

A driving device having a piston pyrotechnically driven in a cylinder, the piston being connected by pulling means to an element to be driven, the cylinder having a stroke limit stop at a rear end thereof, as viewed in driving direction of the piston in the cylinder, includes damping means disposed between the piston and the stroke limit stop of the cylinder, the damping means braking the piston in a predetermined manner upon failure of the pulling means.

6 Claims, 10 Drawing Figures

DRIVING DEVICE ESPECIALLY FOR RETURN STIFFENING OF A SAFETY BELT IN AN AUTOMATIC SAFETY BELT WIND-UP DEVICE

This is a continuation of co-pending application Ser. No. 543,086 filed on Oct. 18, 1983, now abandoned.

The invention relates to a driving device having a piston pyrotechnically driven in a cylinder, especially for return stiffening of a safety belt in an automatic safety belt wind-up device, the piston being connected by tensioning or pulling means to an element to be driven, for example, a belt wind-up shaft, the cylinder having a stroke limit stop at a rear end thereof, as viewed in driving direction of the piston in the cylinder.

In a cylinder/piston drive system wherein the piston is fastened to a piston rod or to a flexible cable, the problem arises that, upon failure of the tension or pulling means i. e. the cable, which is freed from the tensile load, the piston behaves like a freely floating or freely flying projectile in the cylinder, and must be braked in a path of virtually zero length at the stroke limit stop i. e. at the base of the cylinder or at a closure plug.

Due to the very high kinetic energy, very great forces occur at the impact location, so that the cylinder and the stroke limit stop must be of exceptionally stable or sturdy construction in order to be able to absorb these great forces and thereby prevent the sharply accelerated piston from punching or breaking through the stroke limit stop.

It is an object of the invention to provide a driving device of the type described in the introduction hereto which, with relatively simple and especially easier construction, can absorb the kinetic forces, when a break in the tensile or pulling means occurs, so that there is no fear of disruption or destruction of the aforementioned parts.

It is a more specific object of the invention to provide such a driving device wherein a damping member brakes the freely floating piston within a predetermined path so that only a small residual energy acts upon the stiff part of the system, namely on the cylinder and stroke limit stop, the damping means absorbing the kinetic energy of the accelerated piston due to deformation work.

With the foregoing and other objects in view, there is provided, in accordance with the invention, a driving device having a piston pyrotechnically driven in a cylinder, the piston being connected by pulling means to an element to be driven, the cylinder having a stroke limit stop at a rear end thereof, as viewed in driving direction in the cylinder, comprising damping means disposed between the piston and the stroke limit stop of the cylinder, the damping means braking the piston in a predetermimed path upon failure of the pulling means.

In accordance with another feature of the invention, the damping means are formed of a deformable plug.

In accordance with an alternate feature of the invention, the damping means are formed of a spring.

In accordance with a further feature of the invention, the damping means are fastened to an end of the cylinder.

In accordance with an added feature of the invention, the damping means are formed as a sleeve with a sleeve bore opening towards the piston and having a cross section tapering conically downwardly towards the cylinder end, the sleeve bore cross section having an inner diameter affording penetration by the piston into the sleeve bore.

In accordance with an additional feature of the invention, the piston is spherical at an end thereof facing towards the sleeve.

In accordance with an alternate feature of the invention, the piston is conical at an end thereof facing towards said sleeve.

In accordance with yet another feature of the invention, the damping means have a threaded extension forming the stroke limit stop, and a thread is formed, at an end of the cylinder wherein the threaded extension is screwed.

In accordance with yet a further feature of the invention, the pyrotechnically driven piston in the cylinder serves for return stiffening of a safety belt in an automatic safety belt wind-up device and the element to be driven is a belt wind-up shaft.

In accordance with concomitant features of the invention, the driving device has damping means fastened to an end of the cylinder and formed of a sleeve preferably of synthetic material. The sleeve has a sleeve base formed therein which opens towards the piston and has a cross section narrowing conically towards the end of the cylinder. The sleeve bore cross section has an inner diameter which permits penetration of the piston into the sleeve bore. In order to facilitate this penetration, the end of the piston facing the sleeve has a spherical or conical construction. If a break occurs in the pulling means of the driving device of the invention, the freely floating piston penetrates into the sleeve bore and is slowly braked due to the conically narrowing cross section. In this regard, predominantly radial forces occur which deform the wall plastically. Due to this high radial pressure between the cylinder bore and the outer diameter of the sleeve, the axial forces acting upon the stroke limit stop become so small that the stroke limit stop may be produced from a relatively inexpensive or low-priced synthetic material. Preferably, the damping means is, therefore, provided with a threaded extension forming the stroke limit stop and is screwable into an inner thread formed at the end of the cylinder.

Within the scope of the invention it is also possible to arrange the damping means directly on the piston. The axial forces acting upon the stroke limit stop are also reduced thereby, the mass of the piston being increased, however, which results in a reduction in power of the driving device.

Other features which are considered as characteristic for the invention are set forth in the appended claims.

Although the invention is illustrated and described herein as embodied in a driving device especially for return stiffening of a safety belt in an automatic safety belt wind-up device, it is nevertheless not intended to be limited to the details shown, since various modifications and structural changes may be made therein without departing from the spirit of the invention and within the scope and range of equivalents of the claims.

Figure 2:
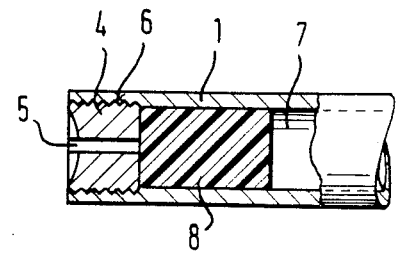
Figure 9:
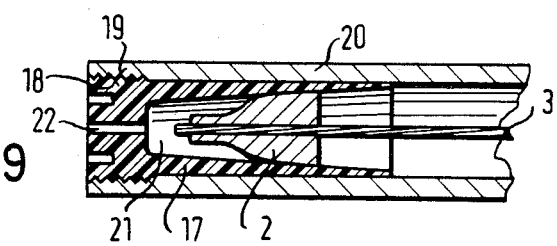
Figure 10:
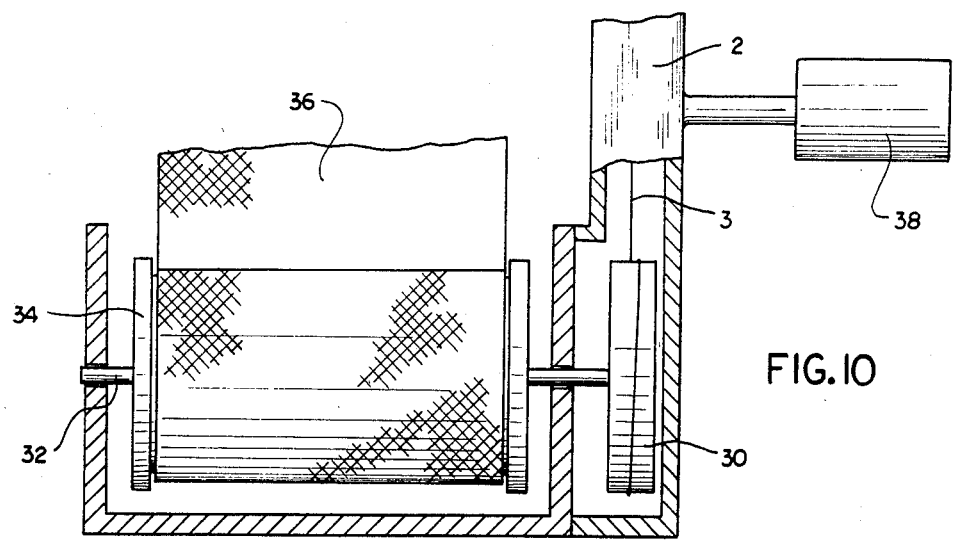

The construction and method of operation of the invention, however, together with additional objects and advantages thereof will be best understood from the following description of specific embodiments when read in connection with the accompanying drawings, in which:

FIGS. 1 and 2; 3 and 4; 5 and 6; and 7 and 8 are pairs of views, respectively exploded perspective and longitudinal sectional, of four different embodiments of the driving device according to the invention; FIG. 9 is another view of FIG. 8 showing the drive device in another phase of operation thereof and FIG. 10 is a schematic illustration of the driving device in connection with a safety belt wind-up device.

Figure 8:
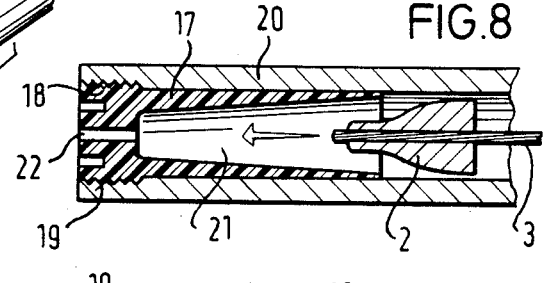

Referring now to the drawing and, first, particularly to FIGS. 1 and 2 thereof, there is shown therein a cylinder formed, for example, of metallic material wherein, as shown in FIG. 8, a piston 2 firmly connected with drawing or pulling means 3 in the form of a flexible cable is slidingly guided. The drawing means 3 is connected at the opposite end thereof with a element to be driven, such as, for example, a cable pulley or roller 30, a belt shaft 32 of a safety belt automatic wind-up device 34 for a safety belt 36. In this regard, the driving device according to the invention serves to effect a so-called return stiffening of the safety belt by providing pyrotechnic force storing means 38 which extend into the cylinder 1 and are ignited, the resultant pressure wave driving the piston 2 in direction of the arrow shown in FIG. 8. In the embodiment of FIGS. 1 and 2, the rear end of the cylinder 1, as viewed in drive direction, is closed by a threaded plug 4 forming a stroke limit-stop for the piston 2, the threaded plug 4 being formed with a venting bore 5. The threaded plug 4 is screwed into an inner thread 6 formed at the rear end of the cylinder 1. Damping means 8 in the form of an elastic yielding, cylindrical plug is located between the threaded plug 4 and the piston 2 in the cylinder bore 7 when stroke impact occurs.

Figure 3:
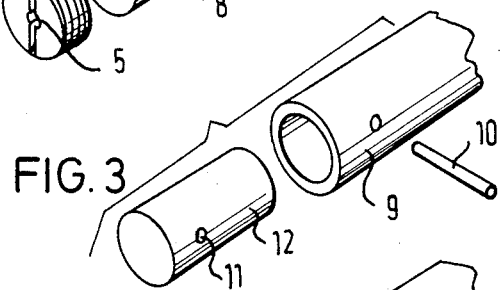
Figure 4:
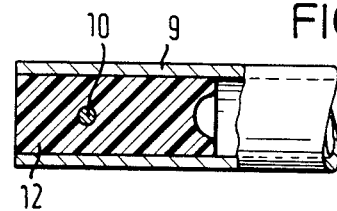

In the embodiment of FIGS. 3 and 4, instead of the threaded plug 4 of FIGS. 1 and 2, a transverse pin 10 is fastened in the cylinder 9 and directly holds the likewise cylindrical damping means 12 formed of elastically yielding material and provided with a bore 11 through which the pin 10 extends and thereby connects the damping means 12 firmly to the cylinder 9.

Figure 5:
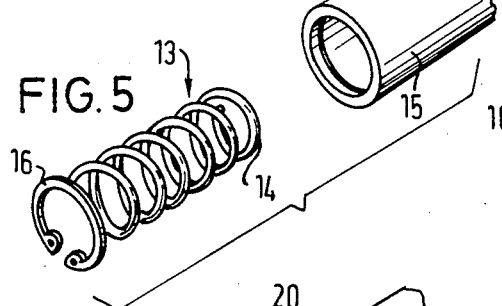
Figure 6:
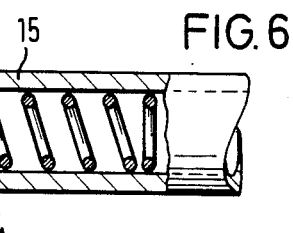

In the embodiment of FIGS. 5 and 6, a damping spring 14 is provided as damping means 13, instead of a plug, and is mounted within the cylinder bore of the cylinder 15 and is braced against a stroke stop 16 formed as a safety ring.

If the pulling or drawing means 3 should break after activation of the pyrotechnic drive, the freely floating piston runs up against the compressible damping means of the embodiments of FIGS. 1 to 6, the damping means absorbing the considerable kinetic energy to a considerable extent. Preferably, the damping means, in the non-stressed condition thereof, is disposed close to the wall of the cylinder bore of the cylinder, so that, when the damping means are compressed, a considerable force is applied in radial direction to the cylinder wall i.e. the axial residual loading is reduced.

Figure 7:
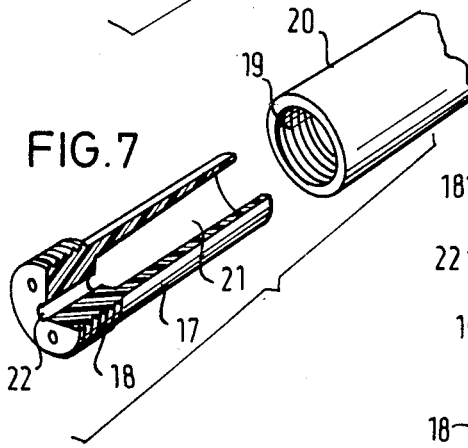

In the embodiment of FIGS. 7 to 9, a sleeve 17 formed of a synthetic material is provided as damping means. This sleeve 17 is elongated, has an outer cylindrical contour and is formed at the rear end thereof with a threaded extension 18 by which the sleeve 17 is screwed into an inner thread 19 formed at the rear end of the cylinder 20, and is thereby fastened. The sleeve 17 is formed with a sleeve bore 21 having a cross section tapering downwardly conically towards the threaded extension 18, as well as having a venting bore 22 formed therein. The inner diameter at the open end of the sleeve bore 21 is of such dimension that the freely floating piston 2 can penetrate into this sleeve bore 21 as is clearly shown in FIGS. 8 and 9. To facilitate this penetration, the piston 2 has a spherical or conical construction at the end thereof facing towards the sleeve 17. As the piston 2 penetrates into the sleeve bore 21, the outer peripheral surface of the piston 2 comes into contact with the inner peripheral surface of the sleeve bore 21, as shown in FIG. 9. As the piston 2 becomes clamped in the sleeve bore 21, predominantly radial forces act upon the sleeve 17 and cause the sleeve wall to become plastically or elastically deformed. Due to the very high radial pressure between the cylinder bore and the outer diameter of the sleeve, the radial forces acting upon the threaded extension 18 become so small that it is possible to make the threaded extension 18 which acts as the stroke stop, and therewith, the entire sleeve 17, out of relatively inexpensive synthetic material.

I claim:

1. An apparatus comprising a reel to tighten a safety belt in response to detonation of an explosive charge, an elongated tubular member to be connected in fluid communication with the explosive charge, a piston disposed in said elongated tubular member, said piston being movable along said elongated tubular member toward one end portion of said tubular member under the influence of high pressure gas conducted from the explosive charge upon detonation of the explosive charge, flexible connector means connected with said piston and safety belt reel for rotating the safety belt reel to wind up the safety belt and for stopping movement of said piston along said tubular member with said piston spaced from the one end portion of said tubular member in the absence of breaking of said flexible connector means under the influence of force applied against said flexible connector means by said piston, and stop means disposed in the one end portion of said tubular member for stopping said piston upon breaking of said flexible connector means under the influence of force applied against said flexible connector means by said piston, said stop means including a body of resiliently deformable material having surface means for defining a cavity with an axial extent which is greater than the axial extent of said piston to enable leading and trailing end portions of said piston to enter the cavity during movement of said piston after breaking of said flexible connector means, said cavity having a side surface which tapers inwardly from an entrance to an end portion having a cross sectional size which is substantially less than a maximum cross sectional size of said piston to enable said piston to radially compress the material of said stop means as said piston moves in the cavity after breaking of said flexible connector means.

2. An apparatus as set forth in claim 1 wherein said piston has an axially tapered configuration to provide for wedging engagement of said piston with the material of said stop means as said piston moves in the cavity.

3. An apparatus as set forth in claim 1 wherein said stop means is at least partially circumscribed by said tubular member, said piston having outer side surface means which presses the material of said stop means against an inner side surface of said tubular member as said piston moves in the cavity to thereby compress the material of said stop means.

4. An apparatus as set forth in claim 1 wherein said cavity has an end wall opposite from the entrance of said cavity, said leading end portion of said piston being spaced from the end wall of said cavity upon stopping of movement of said piston by said stop means.

5. An apparatus as set forth in claim 1 further including thread means formed in said body of resiliently deformable material for engaging a mating thread on the inside of said tubular member to connect said stop means with said tubular member.

6. An apparatus as set forth in claim 1 wherein the entrance to said cavity has a cross sectional size which is greater than the maximum cross sectional size of said piston.

* * * * *